(12) United States Patent
Costanzo et al.

(10) Patent No.: US 7,878,319 B2
(45) Date of Patent: Feb. 1, 2011

(54) CONVEYOR SWITCH

(75) Inventors: Mark Costanzo, River Ridge, LA (US); Eric M. Pressler, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 276 days.

(21) Appl. No.: 12/096,736

(22) PCT Filed: Dec. 20, 2006

(86) PCT No.: PCT/US2006/062393
§ 371 (c)(1),
(2), (4) Date: Jun. 9, 2008

(87) PCT Pub. No.: WO2007/108852
PCT Pub. Date: Sep. 27, 2007

(65) Prior Publication Data
US 2008/0302634 A1 Dec. 11, 2008

Related U.S. Application Data

(60) Provisional application No. 60/597,846, filed on Dec. 21, 2005.

(51) Int. Cl.
*B65G 47/26* (2006.01)
(52) U.S. Cl. .............. 198/457.02; 198/370.09; 198/779
(58) Field of Classification Search ........ 198/457.02, 198/370.01, 370.03, 370.09, 779, 850–853
See application file for complete search history.

(56) References Cited

U.S. PATENT DOCUMENTS

| | | | |
|---|---|---|---|
| 2,566,417 A | 9/1951 | Holm | |
| 4,143,756 A | 3/1979 | Chorlton | |
| 4,264,002 A | 4/1981 | Van Der Schie | |
| 5,092,447 A | 3/1992 | Wyman | |
| 5,101,958 A | 4/1992 | LeMay et al. | |
| 5,238,099 A * | 8/1993 | Schroeder et al. | 198/456 |
| 5,333,722 A | 8/1994 | Ouellette | |
| 5,400,896 A | 3/1995 | Loomer | |
| 6,494,312 B2 | 12/2002 | Costanzo | |
| 6,571,937 B1 | 6/2003 | Costanzo et al. | |
| 6,681,922 B2 | 1/2004 | Corley et al. | |
| 6,758,323 B2 | 7/2004 | Costanzo | |
| 6,968,941 B2 | 11/2005 | Fourney | |
| 7,007,792 B1 | 3/2006 | Burch | |

(Continued)

FOREIGN PATENT DOCUMENTS

WO 2007166633 A2 12/2007

*Primary Examiner*—Douglas A Hess
(74) *Attorney, Agent, or Firm*—James T. Cronvich

(57) ABSTRACT

A sorting switch for diverting articles from one or more infeed conveyors to two or more outfeed conveyors. A cannulae pre-alignment conveyor receives articles from one or more infeed conveyors and selectively diverts individual articles into two or more lateral regions for delivery to an alignment conveyor downstream. The alignment conveyor more precisely aligns the articles within each of the regions for delivery to outfeed conveyors at the downstream end of the alignment conveyor. The alignment and pre-alignment conveyors are realized as belt conveyors with rollers arranged to rotate universally or on axes in specific orientations. In some versions, a belt's rollers roll on bearing surfaces whenever the belt is advancing. In other versions, rollers are selective actuated by moving bearing surfaces. In yet other versions, rollers are not contacted by bearing surfaces at all.

29 Claims, 10 Drawing Sheets

U.S. PATENT DOCUMENTS

| | | |
|---|---|---|
| 7,191,894 B2 | 3/2007 | Costanzo et al. |
| 7,249,669 B2 * | 7/2007 | Fourney ................ 198/370.09 |
| 7,284,653 B2 * | 10/2007 | Fourney et al. ........ 198/370.03 |
| 7,344,018 B2 | 3/2008 | Costanzo et al. |
| 7,364,038 B2 * | 4/2008 | Damkjaer .................. 198/853 |
| 7,537,104 B2 * | 5/2009 | Riddick et al. .............. 198/617 |
| 7,617,923 B2 * | 11/2009 | Riddick et al. ......... 198/457.05 |

* cited by examiner

CONVEYOR SWITCH

BACKGROUND

The invention relates generally to power-driven conveyors and, more particularly, to horizontal switches including conveyor belts with selectively rotatable rollers useful in diverting conveyed articles to selected positions across the width of the belt.

In the package-handling industry, switches are used to merge, divert, or sort packages or articles received from one or more infeed conveyors and discharged onto one or more output conveyors. In a typical sorting application, as illustrated in FIG. 20, a switch 20 sorts articles 22 received from an infeed conveyor 24 by selectively diverting individual articles to one or the other of two parallel outfeed conveyors 26, 27. Shoe sorters are often used as sorting switches in this application.

One typical shoe sorter switch includes an endless conveyor belt or chain constructed of a series of slats flanked by drive chains. Another typical sorter includes rods uniformly spaced between parallel drive chains. A shoe for pushing articles across the sorter is movably attached to each slat or between consecutive rods. Typically, the shoe has an appendage that extends downward of the slat or between the rods. A guide track arrangement in the conveyor frame beneath the conveyor guides the shoes across the conveyor as it is driven in the conveying direction. The specific arrangement of the guide track programs the system to push conveyed articles to specified lateral positions on the sorter.

But these chain-driven sorting switches have shortcomings. One shortcoming is that their construction limits the placement of connecting joints between consecutive slats or rods because of interference with the shoes and associated appendages. For that reason, the slats or rods can sag in the middle because they are supported mainly at the drive chains positioned out of the shoe's travel range at the side edges of the slats. This problem is especially noticeable on wider conveyors. Another shortcoming is that the shoe mechanisms and the guide track arrangement can be complex and, consequently, expensive.

Roller conveyors are also used as shoe sorters in many applications, especially for heavy articles, such as tires, and also for beverage cases and for low-profile, multi-sized articles, such as packages and mail. But one of the problems with roller conveyors is that these metal conveyors can be noisy, especially as their bearings wear. Frequent maintenance operations, such as lubricating and tightening, and repairs are a way of life with roller conveyors.

Thus, there is a need for a conveyor that can sort and divert conveyed articles, such as cases and packages, but without the shortcomings of shoe sorters or roller conveyors.

SUMMARY

This need and other needs are satisfied by a switch embodying features of the invention. One version of the switch comprises an alignment conveyor having a conveying surface that extends longitudinally in a conveying direction from an upstream end to a downstream end and laterally in width from a first side edge to a second side edge. The alignment conveyor includes a carryway having bearing surfaces and at least one conveyor belt advancing along the carryway in the conveying direction. The conveyor belt forms the conveying surface and also includes rollers rotatable on axes oblique to the conveying direction. The rollers extend upward through the thickness of the belt into supporting contact with conveyed articles along the carryway and downward into rolling contact with the bearing surfaces in the carryway. The conveying surface is divided into a first region extending laterally inward from the first side edge and a second region extending laterally inward from the second side edge. The rollers in the first region are oriented to rotate to direct conveyed articles in the first region toward the first side edge, and the rollers in the second region are oriented to rotate to direct conveyed articles in the second region toward the second side edge. A pre-alignment conveyor advances articles in the conveying direction and feeds the articles selectively to the first and second regions of the conveying surface at the upstream end of the alignment conveyor.

In another aspect of the invention, a switch comprises a first conveyor advancing in a conveying direction and receiving articles from an infeed conveyor and a second conveyor advancing in the conveying direction and receiving articles from the first conveyor. The first conveyor includes a roller belt advancing in the conveying direction and having rollers extending through the belt. The rollers are arranged to rotate on axes oblique to the conveying direction. A bearing surface underlying the roller belt is selectively actuatable between a first position out of contact with the rollers and a second position contacting the rollers and causing the rollers to rotate as the roller belt advances. Thus, articles conveyed atop the rollers while the bearing surface is in the second position are pushed to one side of the roller belt by the rotating rollers as the roller belt advances. The second conveyor includes at last one roller belt extending in width from a first side to a second side. Rollers extending through the belt are arranged to rotate on axes oblique to the conveying direction. The one or more roller belts include a first region extending inward from the first side positioned to receive articles pushed to one side on the first conveyor and a second region extending inward from the second side positioned to receive the other articles. Bearing surfaces underlie at least a portion of the rollers to cause the rollers to rotate by contact with the bearing surfaces as the roller belt or belts advance in the conveying direction. The rollers in the second region are in constant contact with the underlying bearing surfaces and are arranged to rotate on second oblique axes oriented to direct articles conveyed atop the rollers in the second region toward the second side. The rollers in the first region are out of contact with the bearing surfaces or are in contact with the underlying bearing surfaces and arranged to rotate on first oblique axes oriented to direct articles conveyed atop the rollers in the first region toward the first side.

In another aspect of the invention, a switch for distributing articles received from an infeed conveyor to a plurality of outfeed conveyors comprises an alignment conveyor and a pre-alignment conveyor. The alignment conveyor advances from an upstream end to a downstream end in a conveying direction and has a conveying surface divided laterally in width into a plurality of lanes. Each lane terminates in an associated outfeed position marking an outfeed conveyor at the downstream end of the alignment conveyor. Articles received in each lane at the upstream end are directed to the associated outfeed position of the lane as the articles are conveyed from the upstream end to the downstream end of the alignment conveyor. The pre-alignment conveyor, which is disposed at the upstream end of the alignment conveyor and extends from an upstream end to a downstream end in the conveying direction, conveys articles received from an infeed conveyor at the upstream end. The pre-alignment conveyor selectively shifts the articles laterally to distribute the articles among the lanes of the alignment conveyor. The alignment conveyor includes at least one roller belt having article-supporting rollers extending through the belt and rotatable on axes oblique to the conveying direction. Bearing surfaces underlie the roller belt and contact at least a portion of the rollers to cause the rollers to rotate and direct articles laterally as the roller belt advances in the conveying direction. The pre-alignment conveyor includes a roller belt with article-supporting rollers arranged to enable articles conveyed atop the rollers to be directed laterally across the pre-alignment conveyor as the roller belt advances.

BRIEF DESCRIPTION OF THE DRAWINGS

These features and aspects of the invention, as well as its advantages, are better understood by reference to the following description, appended claims, and accompanying drawings, in which:

DETAILED DESCRIPTION

Figure 1:
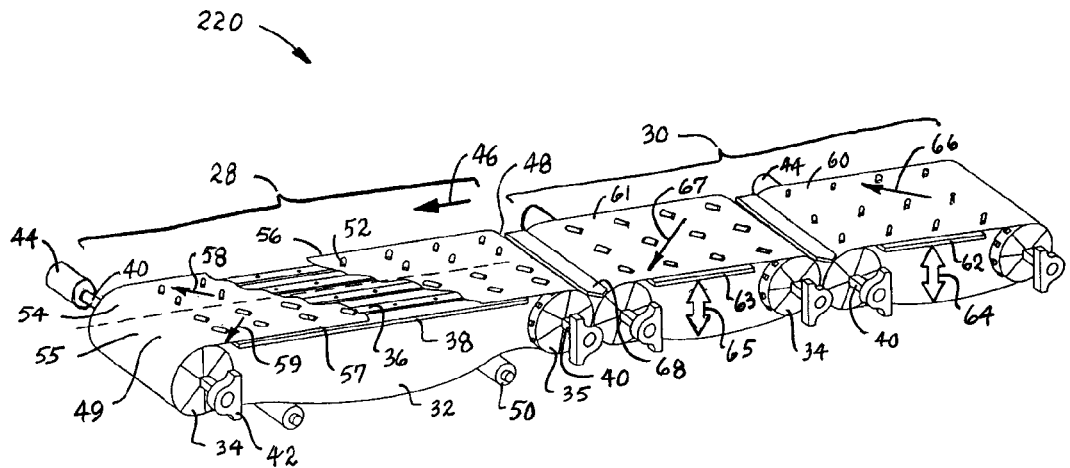
FIG. 1 is an isometric view of a conveyor switch embodying features of the invention, including selectively actuated oblique-roller belts in a pre-alignment conveyor.

One version of a switch is shown in FIG. 1. The switch 220 comprises an alignment conveyor 28 fed by a pre-alignment conveyor 30. The alignment conveyor includes a roller belt 32 trained about drive and idler sprocket sets 34, 35. The belt is supported in an upper carryway formed by wearstrips 36 mounted to a carryway bed 38. The upper surfaces of the wearstrips form bearing surfaces on which the roller belt rides. The sprocket sets are mounted on shafts 40 rotatably mounted to a conveyor frame (not shown) in bearing blocks 42. A motor 44 coupled to the drive shaft advances the roller belt longitudinally in a conveying direction 46 from an upstream end 48 to a downstream end 49. The roller belt is supported by shoes or rollers 50 in a lower returnway.

Rollers 52 extend through the thickness of the belt into contact with the bearing surfaces of the wearstrips below the belt on the carryway and into supporting contact with articles conveyed atop the belt. As the belt advances in the conveying direction, the rollers roll on the wearstrips and rotate on their axes to further propel conveyed articles. The conveying surface of the roller belt is divided into two regions, or longitudinal lanes, along the carryway. The rollers in a first region 54 extending inward of a first side edge 56 of the belt are oriented on axes oblique to the conveying direction to propel conveyed articles toward the first side edge as indicated by arrow 58. The rollers in a second region 55 extending inward of an opposite second side edge 57 of the belt are oriented on axes oblique to the conveying direction to propel articles toward the second side edge as indicated by arrow 59. Thus, an article received on the belt at the upstream end in the first region is diverted toward the first side edge, and an article received in the second region is diverted toward the second side edge. Side rails (not shown) flanking the belt at the first and second side edges form a registration surface along the edges and prevent diverted articles from falling off the conveyor. Articles exiting the belt in the first region are transferred off the downstream end to one of the outfeed conveyors, and articles exiting the belt in the second region are transferred to the other outfeed conveyor.

The pre-alignment conveyor 30 is programmed to selectively feed articles to the first or second region of the alignment conveyor 28. The pre-alignment conveyor comprises two oblique-roller belts 60, 61 in series. The two belts advance in the conveying direction driven by individual motors 44 coupled to drive shafts 40 and sprocket sets 34. The carryways of the oblique-roller belts include bearing surfaces 62, 63 that are selectively movable into and out of contact with the rollers. The bearing surfaces 62, 63 may be raised and lowered into and out of contact with the rollers as indicated by arrows 64, 65 or moved side to side into and out of contact. Various means may be used to selectively rotate the rollers by moving the bearing surfaces; e.g., hydraulic or pneumatic pistons, solenoids, electric motors. When the bearing surface contacts the rollers, they roll on the bearing surface and rotate to propel conveyed articles toward a side edge of the belt as it advances. The rollers in the upstream belt 60 are arranged to rotate on axes oblique to the conveying direction to propel articles toward one side edge of the conveyor as indicated by arrow 66. The rollers in the downstream belt 61 are arranged to divert articles toward the other side edge as indicated by arrow 67. Raising or otherwise moving the bearing surfaces into contact with the rollers actuates the rollers to roll as the belts advance.

Figure 2:
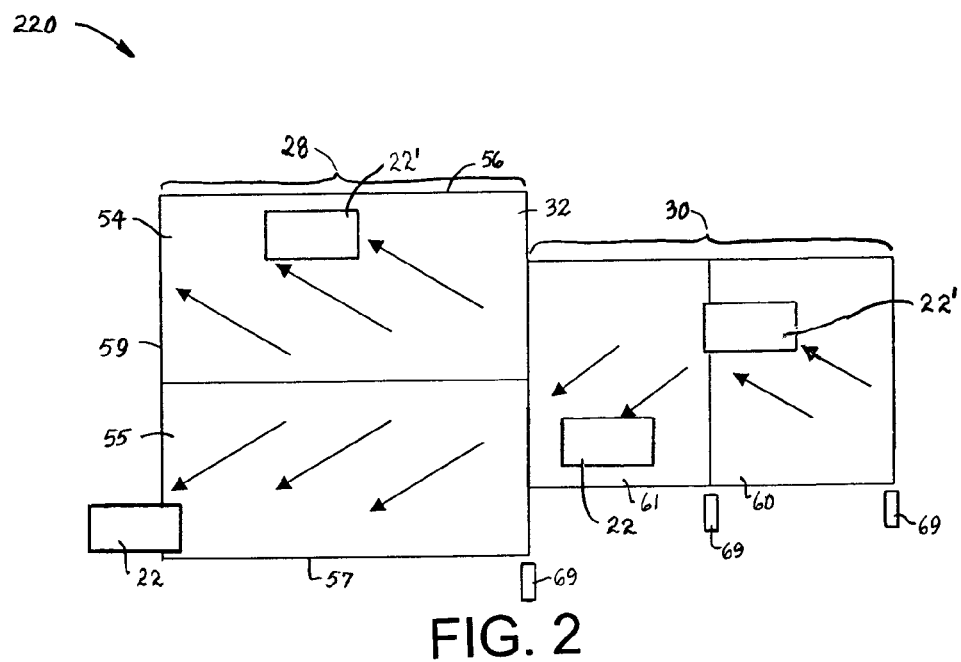
FIG. 2 is a top plan schematic of the switch of FIG. 1 illustrating its operation.

The operation of the switch 120 is illustrated in FIG. 2. If an article 22 fed onto the pre-alignment conveyor 30 is scheduled to be diverted to the second region 55 of the alignment conveyor for delivery to an outfeed conveyor at the second side 57 of the downstream end 59, the rollers in the upstream oblique-roller belt 60 are deactuated while the rollers in the downstream oblique-roller belt 61 are actuated. In this way, the article 22 is conveyed by the upstream belt without sidewise motion because its rollers are not rotated by rolling contact with the underlying deactuated bearing surfaces. The rollers in the downstream belt 61 are actuated by positioning its underlying bearing surfaces in contact with the rollers. As the downstream belt advances, the article is diverted toward the second region 55 of the alignment conveyor 28. The pre-aligned article delivered to the second region of the alignment conveyor over the interposed deadplate 68 (FIG. 1) is moved further toward the second side on the alignment belt 32 as it advances until it is transferred off the downstream end of the switch to the outfeed conveyor at the second side. If a subsequent article 22' is scheduled to be delivered to the outfeed conveyor at the first side 56 of the switch, the rollers in the upstream oblique-roller belt 60 are actuated to divert the article toward the first side edge, and the rollers in the downstream pre-alignment belt 61 are deactuated to maintain the article 22' in position laterally to be received in the first region 54 of the alignment conveyor 32 for delivery to the outfeed conveyor at the first side. Sensors 69 positioned at strategic locations along the conveying path, such as at transitions between belts, signal the position of an article to a controller (not shown) that controls the actuation of the bearing surfaces.

Figure 3:
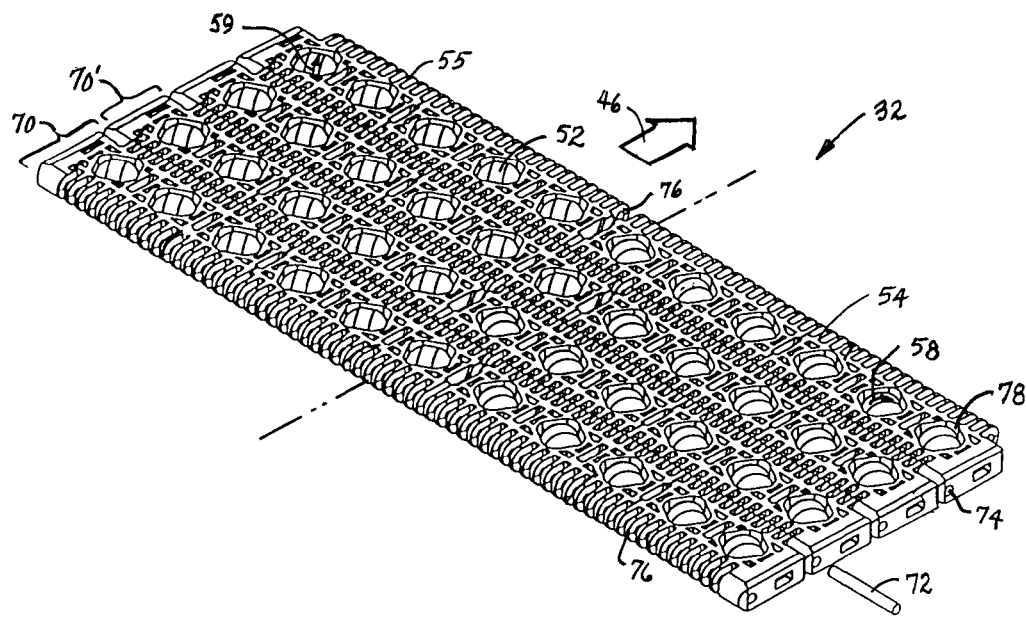
FIG. 3 is an isometric view of a portion of a modular roller conveyor belt usable in a switch as in FIG. 1.
Figure 4:
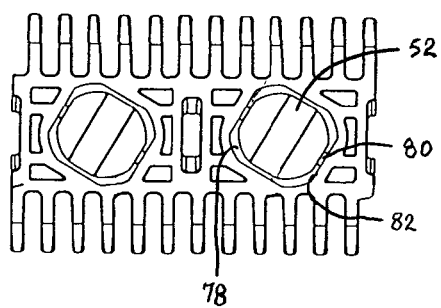
FIG. 4 is a bottom plan view of a portion of the roller belt of FIG. 3.
Figure 5:
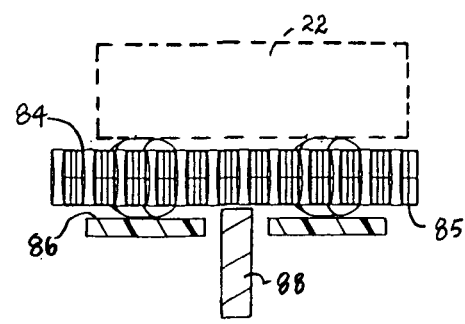
FIG. 5 is a front elevation view of the belt portion of FIG. 4 showing the rollers engaging underlying bearing surfaces.

One realization of the alignment belt 32 of FIG. 1 is shown in FIG. 3. The belt shown is a modular plastic conveyor belt constructed of one or more belt modules arranged side by side in rows 70, 70'. The rows are held together by hinge pins 72 confined in lateral passageways 74 through aligned hinge eyes 76 at opposite ends of each row. The rollers 52 in the first region 54 are mounted in cavities 78 on axes oblique to the conveying direction 46. The angle of the axes causes the rollers to rotate in an oblique direction 58. The rollers in the second region 55 are mounted in cavities on axes oriented to rotate in another oblique direction 59. As shown in FIG. 4, the rollers 52 are mounted on axles 80 extending through opposite walls 82 of the cavities 78. The axles, which are received in central bores through the rollers, define the axes of rotation of the rollers. As shown in FIG. 5, salient portions of the rollers 52 extend past top 84 and bottom 85 surfaces of the belt. The tops of the rollers support conveyed articles 22. The bottoms of the rollers ride along bearing surfaces 86, which may be permanently positioned in contact with the rollers, as shown, or selectively movable into and out of contact. If the bearing surfaces are movable into and out of contact with the rollers, a supporting rail 88 is provided to support the belt along longitudinal lanes devoid of rollers. Many of the details in FIGS. 3-5 may apply to any of the roller belts, whether used as pre-alignment belts or alignment belts.

Figure 6:
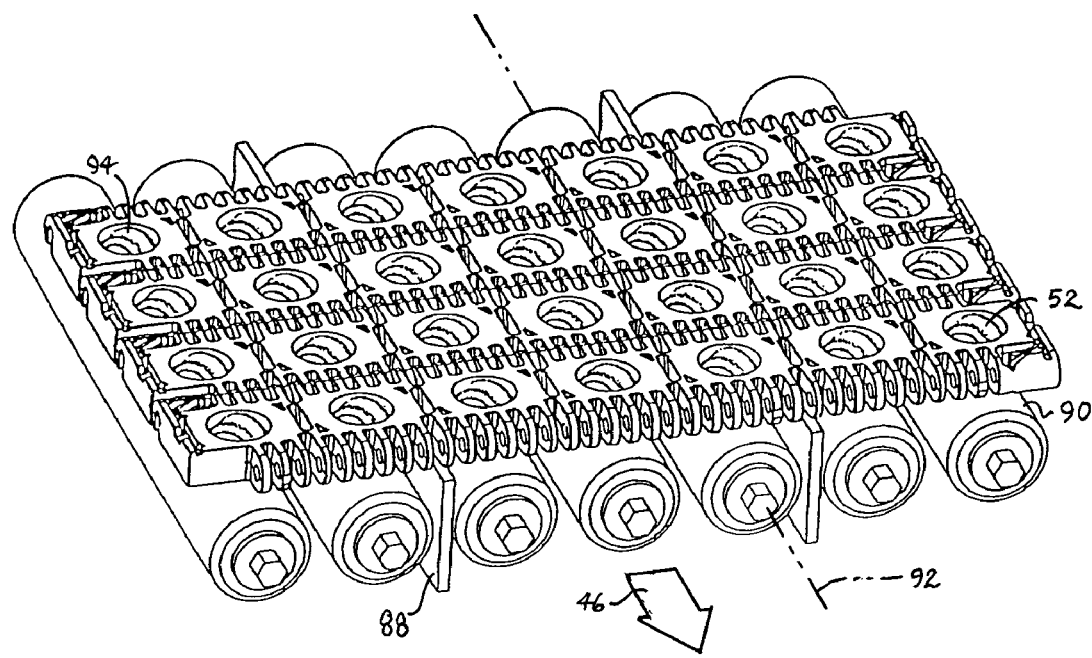
FIG. 6 is an isometric view of another version of bearing surfaces engaging the rollers of a roller belt usable in a switch as in FIG. 1.

An alternative bearing surface is shown in FIG. 6. In this example, the flat bearing surfaces of wearstrips or wear pans is replaced by an array of long rollers 90 whose axes of rotation 92 are parallel to the conveying direction 46. Like the flat bearing surfaces, the long-roller bearing surfaces can be actuated by appropriate means for selectively rotating the rollers into and out of contact with the bottoms of the belt rollers 52. Belt rollers with an outer rubber tire 94 are particularly effective because they get better traction on the peripheries of the long rollers. The belt section shown in FIG. 6 with all the rollers oriented parallel to one side is one realization of the downstream pre-alignment belt 61 in FIG. 1. If the angle of the belt rollers in FIG. 6 is changed to direct articles toward the other side, the belt can be used as the upstream pre-alignment belt 60 of FIG. 1.

Figure 9:
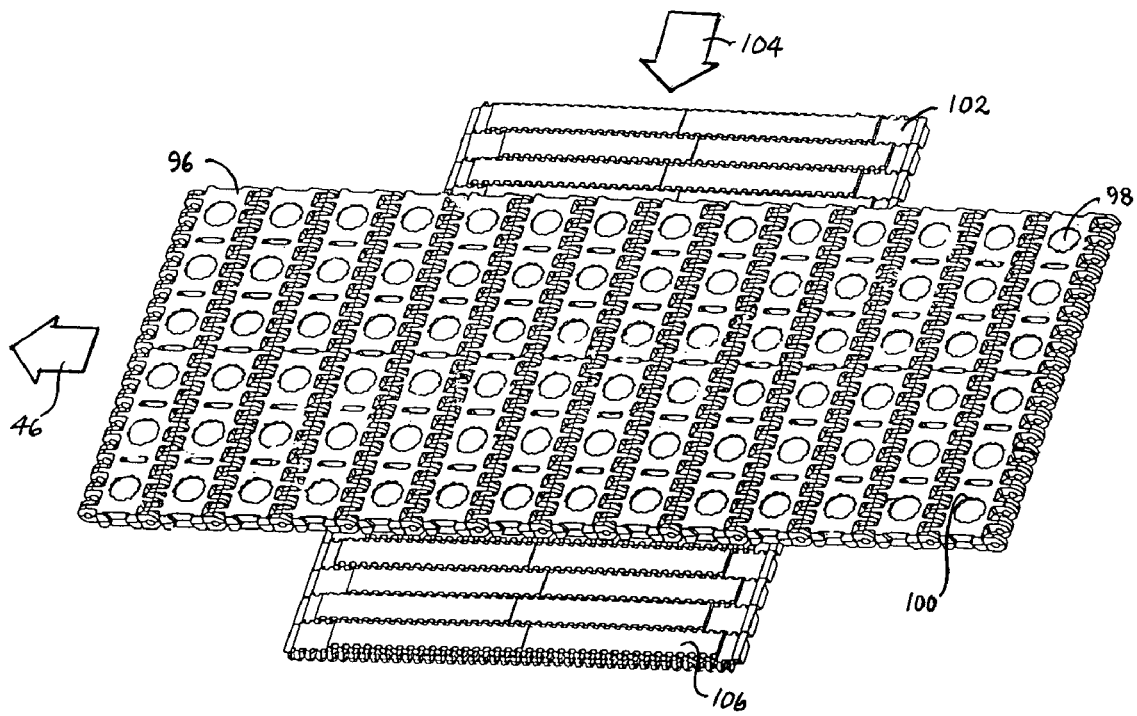
FIG. 9 is an axonometric view of a portion of a ball belt and a ball-contacting friction-top belt usable in a switch as in FIG. 7.
Figure 7:
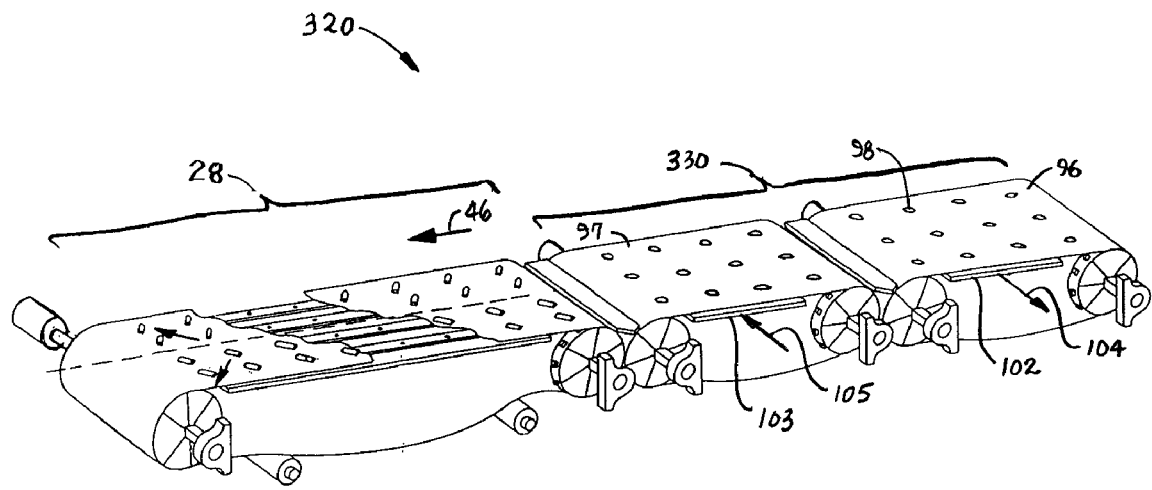
FIG. 7 is an isometric view of another version of a switch embodying features of the invention, including a pre-alignment conveyor with two ball belts and selectively actuated roller balls.

Another version of a switch is shown in FIG. 7. The switch 320, like the switch 220 in FIG. 1, has an alignment conveyor 28 and a pre-alignment conveyor 330. The alignment conveyor shown is identical to the alignment conveyor in the switch of FIG. 1. The pre-alignment conveyor differs in structure, but not function, from the pre-alignment conveyor in FIG. 1. Instead of oblique-roller belts, the pre-alignment conveyor of FIG. 7 uses roller-ball belts 96 with universally rotatable spherical roller balls 98 mounted in cavities 100 opening onto the top and bottom sides of the belt, as also shown in FIG. 9. Bearing surfaces for the roller balls is provided by a friction-top belt 102 running inside the loop of the roller-ball belt in a direction 104 transverse to the conveying direction 46. Rubber or elastomeric pads 106 molded or attached to the outer surface of the friction-top belt contact the bottoms of the roller balls and cause them to rotate to direct conveyed articles 22 across the roller-ball belt opposite to the direction of travel 104 of the friction-top belt. The two ball belts, which constitute means for selectively rotating the rollers, could alternatively be replaced by a single ball belt with a single bidirectional friction-top belt below to divert articles selectively toward one side or the other. As shown in FIG. 7, the rollers in a downstream ball belt 97 in the pre-alignment conveyor are driven by a friction-top belt 103 traveling in a direction 105 opposite to the direction 104 of the friction-top belt 102 engaging the roller balls of the upstream ball belt 96.

Figure 8:
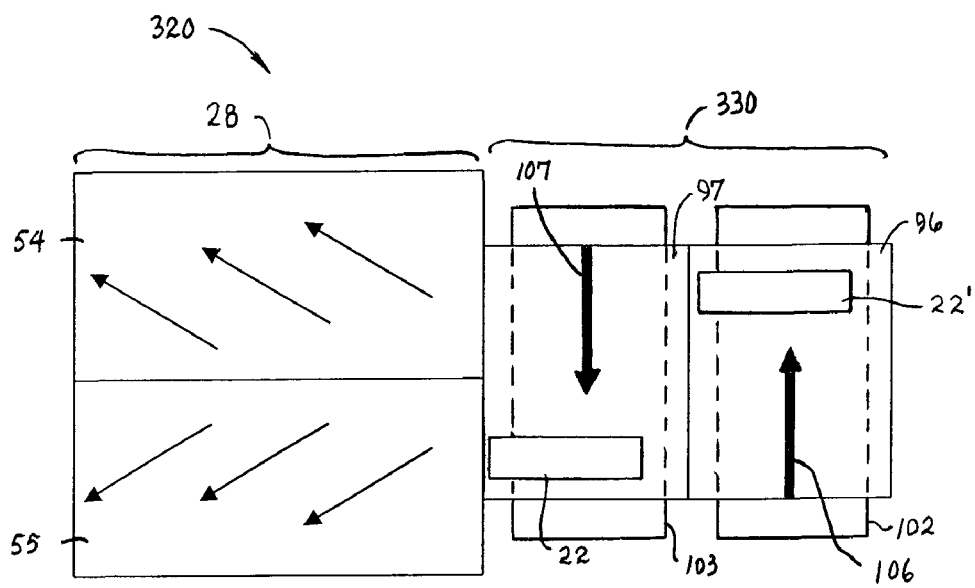
FIG. 8 is a top plan schematic of the switch of FIG. 7 illustrating its operation.

The operation of the pre-alignment conveyor 330 is shown in FIG. 8. As a first article 22, destined for the outfeed conveyor at the downstream end of the second region 55 of the alignment conveyor 28, is received on the pre-alignment conveyor, the upstream friction-top belt 102 is stopped or disengaged from contact with the roller balls extending through the upstream roller-ball belt 96. This allows the article 22 to proceed along the upstream ball belt without being shifted laterally. The downstream friction-top belt 103 is timely activated to engage the rollers in the downstream roller-ball belt 97 to push the article, as indicated by arrow 107, toward the second region 55 of the alignment conveyor 28. Another article 22', destined for the outfeed conveyor receiving articles from the first region 54 of the alignment conveyor, is pushed in the opposite direction 106 by the roller balls' engagement with the upstream friction-top belt 102. The downstream friction-top belt is stopped or disengaged from the roller balls in the downstream roller belt 97 to maintain the article's lateral position for delivery to the first region 54 of the alignment conveyor.

Figure 10:
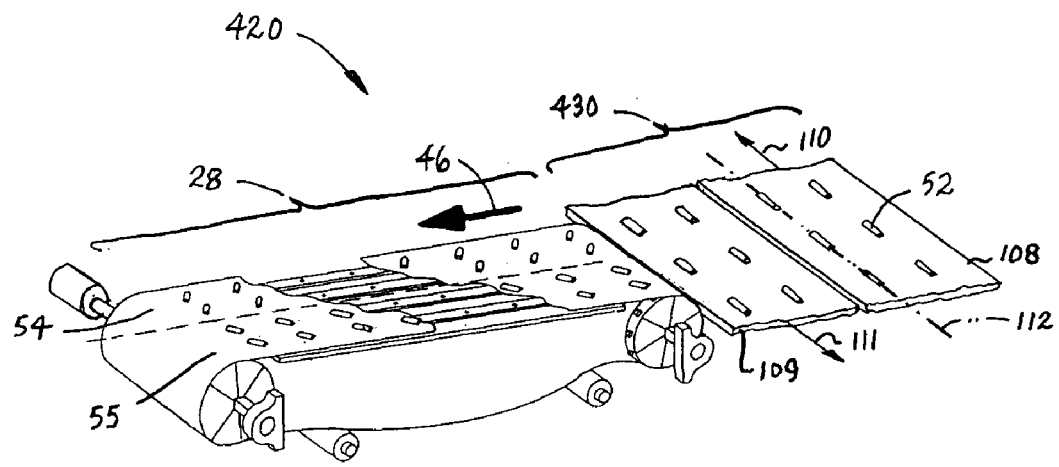
FIG. 10 is an isometric view of another version of a switch embodying features of the invention, including a pre-alignment conveyor with a pair of transverse-roller belts selectively drivable in opposite directions.
Figure 11:
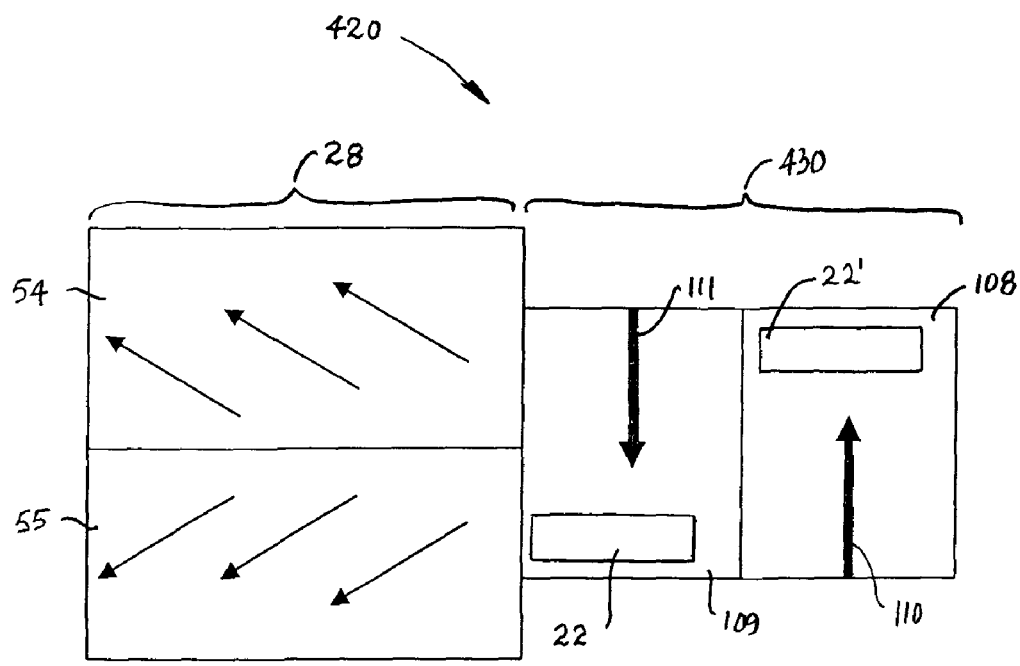
FIG. 11 is a top plan schematic of the switch of FIG. 10 illustrating its operation.

A switch with an alternative pre-alignment conveyor is shown in FIGS. 10 and 11. The switch 420 has an alignment conveyor as those in FIGS. 1 and 7. A pre-alignment conveyor 430 directing conveyed articles 22 selectively to the first or second regions 54, 55 of the alignment conveyor is constructed of two parallel transverse-roller belts 108, 109 driven in opposite directions 110, 111 transverse to the main conveying direction 46. The belts, which are driven conventionally, such as by motors, drive shafts, and sprockets or pulleys, constitute means for selectively rotating the rollers. The rollers 52 in the transverse-roller belts rotate on axes 112 oriented in the direction of travel 110, 111 of the belts. The rollers in the transverse-roller belt do not contact bearing surfaces below the belt and are free to rotate on their axes. This allows articles propelled in the conveying direction on an infeed conveyor to ride across the conveying surfaces of the pre-alignment conveyor atop the freely rotatable rollers. A conveyed article supported atop the rollers is shifted laterally across the conveyor by the advancement of one or the other of the transverse-roller belts. As illustrated in FIG. 11, a first article 22 rolling across the rollers in the pre-alignment conveyor is diverted toward the second region 55 of the alignment conveyor 28 by driving the downstream roller belt 109 in the direction 111 toward the second region. The upstream roller belt 108 is stopped as the first article is pushed onto the pre-alignment conveyor 430. A second article 22', destined for the first region 54 of the alignment conveyor, is diverted toward the first region by advancing the upstream roller belt in the direction 110 indicated. The downstream roller belt is stopped when the second article reaches it. In this way, the second article is allowed to roll across the downstream roller belt toward the first region without further lateral shifting.

Figure 12:
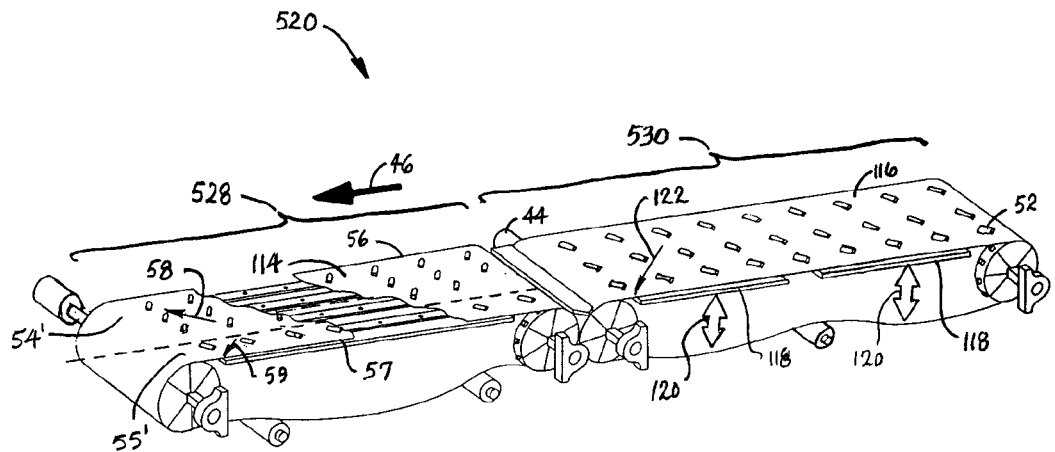
FIG. 12 is an isometric view of yet another version of a switch embodying features of the invention, including a pre-alignment conveyor with an oblique-roller belt having selectively actuated regions.
Figure 13:
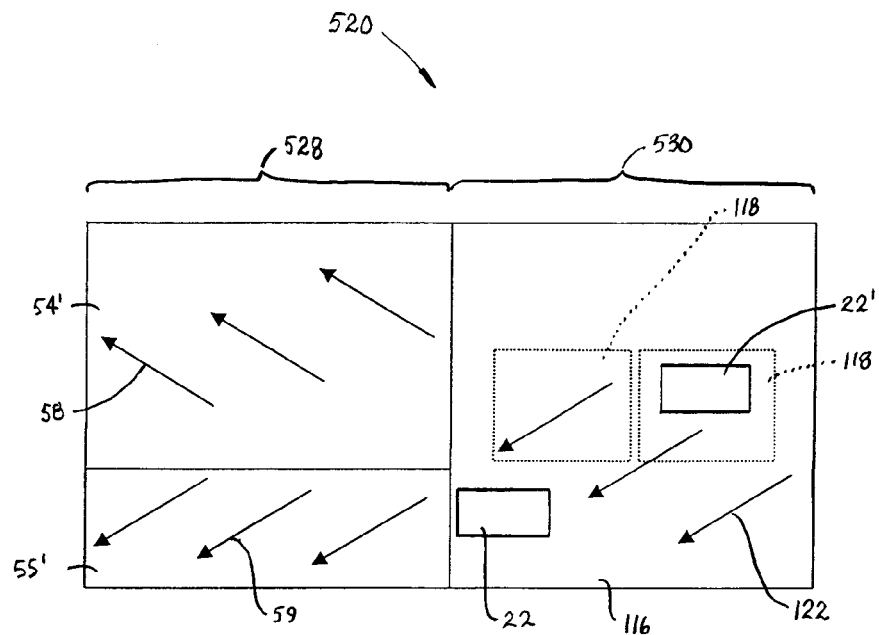
FIG. 13 is a top plan schematic of the switch of FIG. 12 illustrating its operation.

Another version of a switch is shown in FIG. 12. This switch 52 comprises a pre-alignment conveyor 530 feeding an alignment conveyor 528. The alignment conveyor includes an oblique-roller belt 114 that is divided into first and second regions 54', 55' of unequal width. But, like the rollers in the belts of the alignment conveyors with equal-width first and second regions 54, 55, the rollers in each region of this belt are oriented to push articles toward the first and second side edges 56, 57 as indicated by arrows 58, 59. The pre-alignment conveyor 530 diverts articles received from an infeed conveyor generally centrally located across the switch's width. The pre-alignment conveyor includes an oblique-roller belt 116 driven in the conveying direction 46 by a drive motor 44. One or more selectively actuatable bearing surfaces 118, 118' underlie the belt carryway. As shown, the bearing surfaces are raised and lowered 120 to actuate or deactuate the belt rollers 52. The rollers are all arranged to rotate on axes oblique to the conveying direction to push articles in the direction of arrow 122 toward the second region 55' of the alignment conveyors when the rollers are actuated by contact with the raised bearing surfaces. Multiple sequentially actuatable bearing surfaces can be used along the length of the pre-alignment belt to allow articles to be closely spaced on the switch for greater throughput. As illustrated in FIG. 13, the bearing surfaces 118 are raised to actuate the rollers to push a first conveyed article 22 received from a central infeed conveyor in an oblique direction 122 toward the second side region 55' of the alignment conveyor. The bearing surfaces are lowered to deactivate the rollers in the case of a second article 22' destined for the first region 54' of the alignment conveyor. With the rollers deactivated, the article 22' received on the pre-alignment belt is not shifted laterally and advances straight through to the expanded-width first region 54' of the alignment conveyor, which diverts it further to the outfeed conveyor at that side of the switch.

Figure 14:
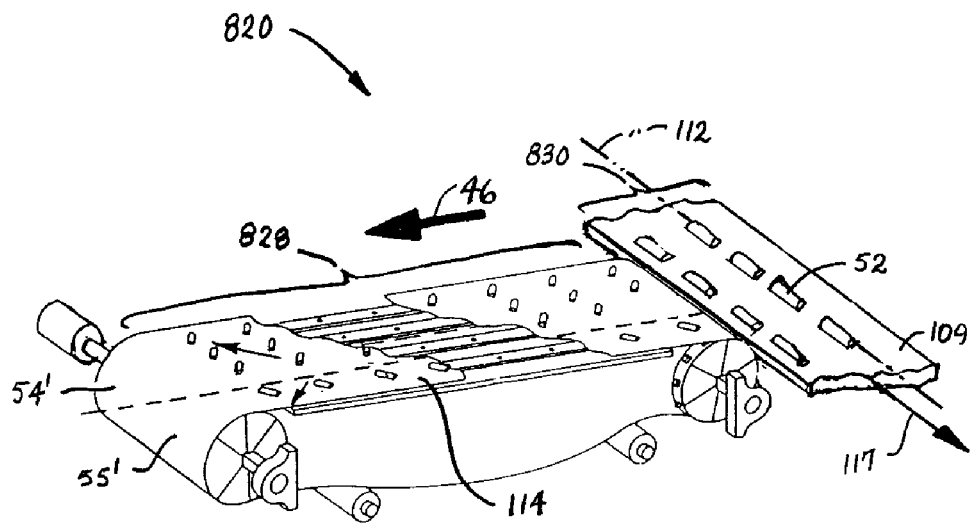
FIG. 14 is an isometric view of another version of a switch embodying features of the invention, including a pre-alignment conveyor with a single, selectively driven, unidirectional transverse-roller belt.
Figure 15:
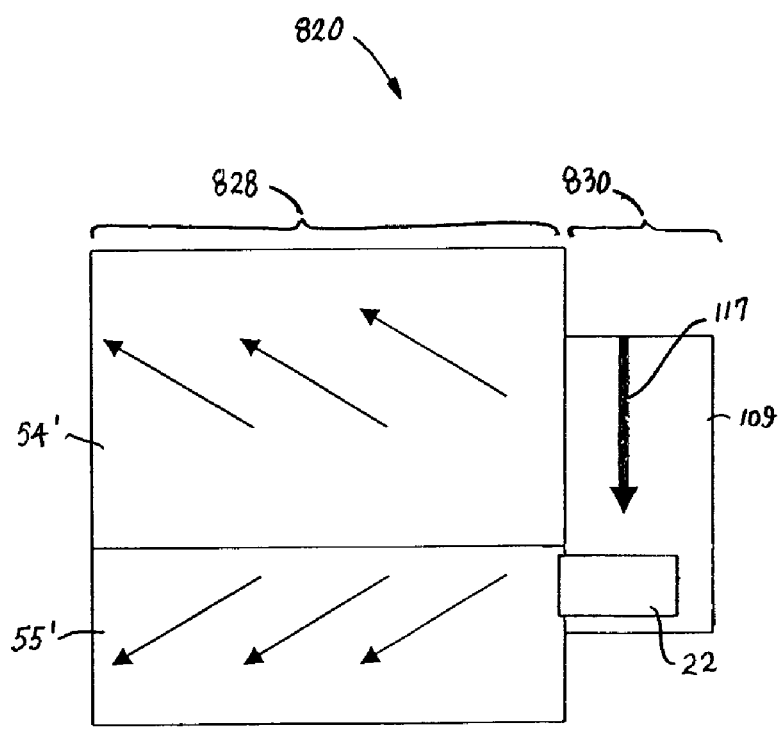
FIG. 15 is a top plan schematic of the switch of FIG. 14 illustrating its operation.

Like the switch in FIG. 12, the switch 820 in FIG. 14 has an alignment conveyor 828 with an oblique-roller belt 114 that is divided into first and second lanes, or regions 54', 55' of unequal width. A pre-alignment conveyor 830 includes a transverse-roller belt 109 that is selectively driven in one direction 117 from the wide region 54' toward the narrow region 55'. The rollers 52, which do not necessarily extend through the thickness of the belt, are free to rotate on their axes 112 without engaging an underlying bearing surface. Thus, the rollers act as idle rollers that rotate only when engaged by an article having a component of motion transverse to the rollers' axes. The forward momentum of articles fed onto the pre-alignment conveyor in the conveying direction 46 carries the articles across the freely rotatable rollers to the alignment conveyor. As shown in FIG. 15, an article 22 fed onto the pre-alignment conveyor from an infeed conveyor positioned midway along the upstream end of the pre-alignment conveyor can be directed to either the wide region or the narrow region of the alignment conveyor. If the article is destined for the wide region, the transverse-roller belt is halted and the centrally fed package is allowed to proceed directly across the pre-alignment conveyor to the wide region of the alignment conveyor. If the article is destined for the narrow region of the alignment conveyor, the transverse-roller belt is driven in the direction 117 toward the narrow region to deliver the article to the alignment conveyor. Instead of a transverse-roller belt, a belt having freely rotatable roller balls could be used to similar effect.

Figure 16:
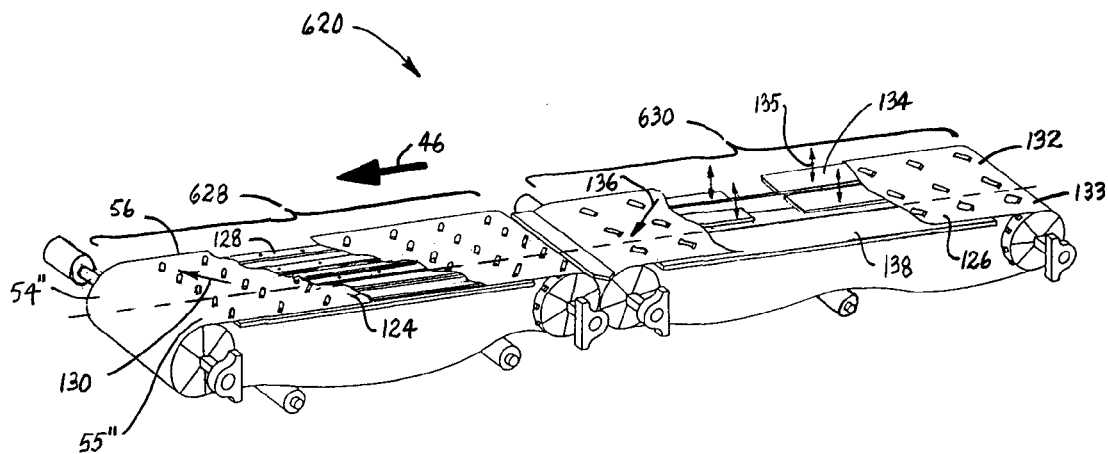
FIG. 16 is an isometric view of another version of a switch embodying features of the invention, including a pre-alignment conveyor with an oblique-roller belt having a selectively actuated region beside a permanently actuated region.
Figure 17:
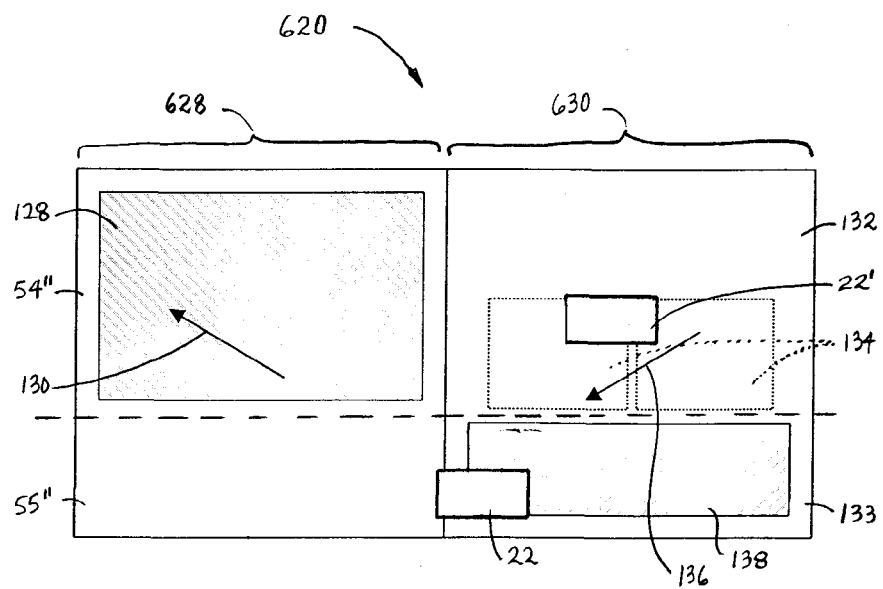
FIG. 17 is a top plan schematic of the switch of FIG. 16 illustrating its operation.

The switch 620 in FIG. 16 comprises an alignment conveyor 628 and a pre-alignment conveyor 630 both of which include oblique-roller belts 124, 126. The rollers in the alignment belt are arranged to rotate on axes oblique to the conveying direction 46. Wearstrips 128 underlie the rollers in a first region 54" of the belt. The rollers roll on the bearing surfaces of the wearstrips to propel conveyed articles toward the first side edge 56 of the switch, as indicated by arrow 130. The rollers in a second region 55" of the oblique-roller alignment belt are mounted to rotate on axes parallel to the axes of the rollers in the first region. But the rollers in the second region do not engage bearing surfaces below the belt. Consequently, articles received in the second region are not shifted laterally across the belt and maintain their lateral positions. In this example, the first region with the actuated rollers is wider than the second region with unactuated rollers. The pre-alignment conveyor 630, which diverts articles received from an infeed conveyor to either the first region or the second region of the alignment conveyor, is also divided into two regions that correspond to the regions of the alignment conveyor. In a first region 132, the oblique-roller belt 126 is supported on one or more selectively actuated bearing surfaces 134. The bearing surfaces are raised and lowered as indicated by arrows 135 between roller-actuated and idle positions. Because the axes of the rollers in the pre-alignment belt are mirror images of the axes of the rollers in the alignment conveyor belt 124, the rollers, when actuated, push conveyed articles toward a second region 133, as indicated by arrow 136. The rollers in the second region 133 ride along a bearing surface 138 held permanently in place to keep the rollers in the second region in constant rotation to urge articles toward that side of the switch. The operation of the switch is illustrated in FIG. 17. A first article 22 fed by an infeed conveyor at the center of the pre-alignment conveyor 630 in the wider first region 132 and destined for the second region 55" of the alignment conveyor, is pushed in the direction of arrow 136 by rollers actuated by the raising of the bearing surfaces 134. Once an article is transferred to the second region of the pre-alignment belt, the constantly actuated rollers continue to push the article in the same direction to ensure that, by the time the article is advanced to the alignment conveyor, it lies in the second region 55" along which it is conveyed without further lateral translation to an outfeed conveyor at the downstream end of the second region. A centrally fed second article 22' destined for the first region 54" of the alignment conveyor is allowed to pass along the pre-alignment conveyor without diversion by lowering the underlying bearing surfaces 134 into the deactivated position out of contact with the rollers. As indicated in FIG. 15, the rollers on the outermost side of the first region do not require underlying bearing surfaces for the rollers to ride on, unless the infeed conveyor is positioned to feed articles in that portion of the first region. Articles received in the first region 54" of the alignment conveyor 628 are translated laterally even farther by the constantly actuated rollers in the second region. The second articles then exit the downstream end of the switch onto another outfeed conveyor.

Figure 18:
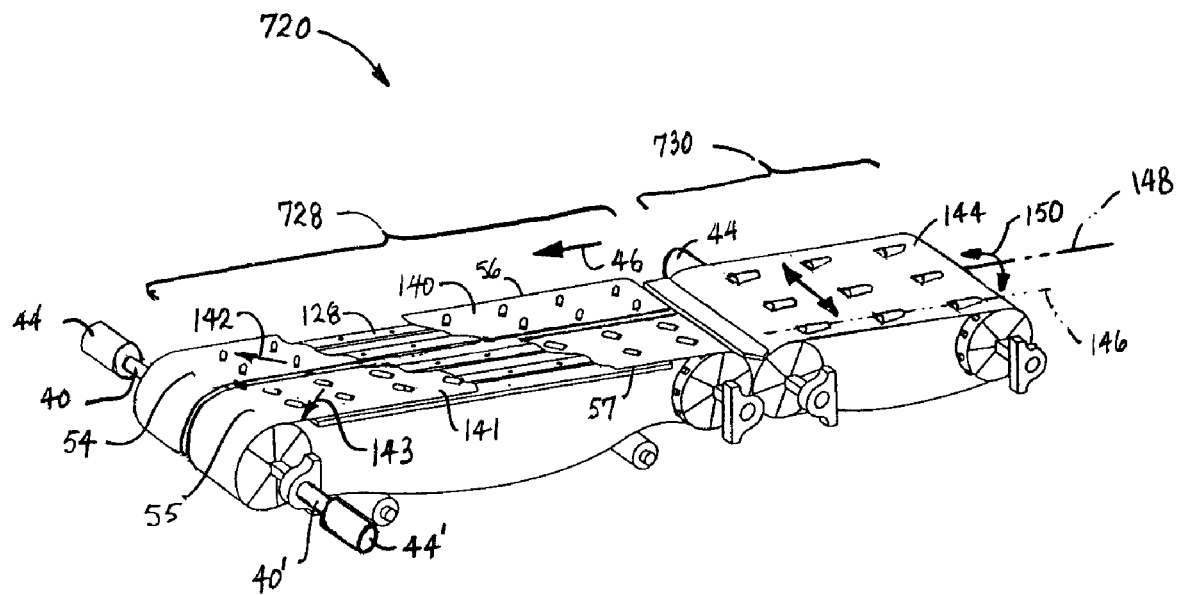
FIG. 18 is an isometric view of another version of a switch embodying features of the invention, including a pre-alignment conveyor having a selectively tiltable transverse-roller belt.
Figure 19:
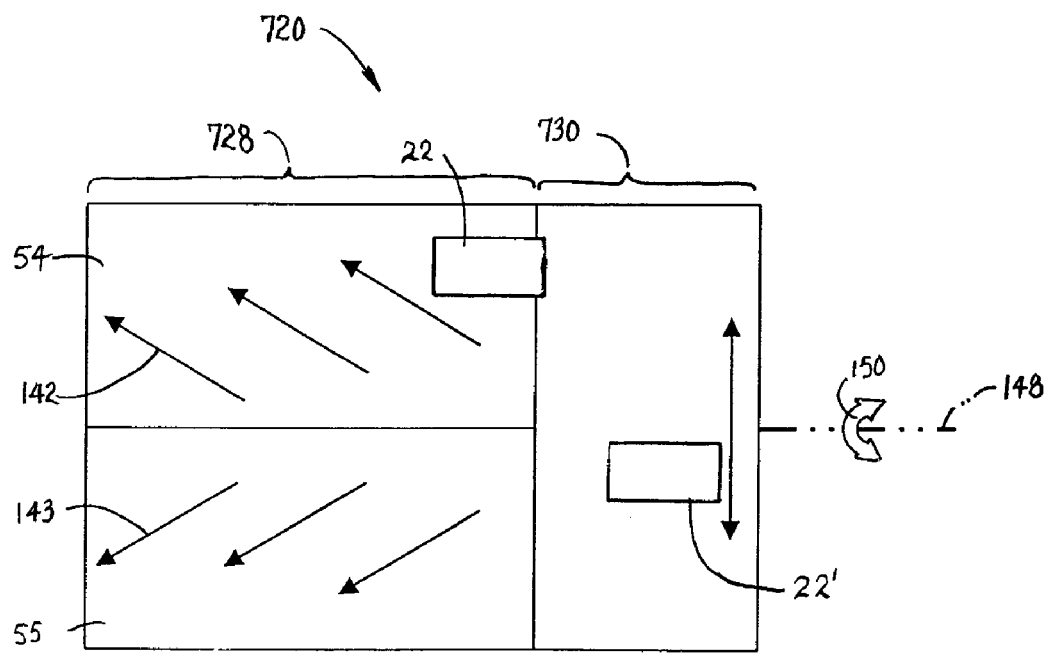
FIG. 19 is a top plan schematic of the switch of FIG. 18 illustrating its operation.
Figure 20:
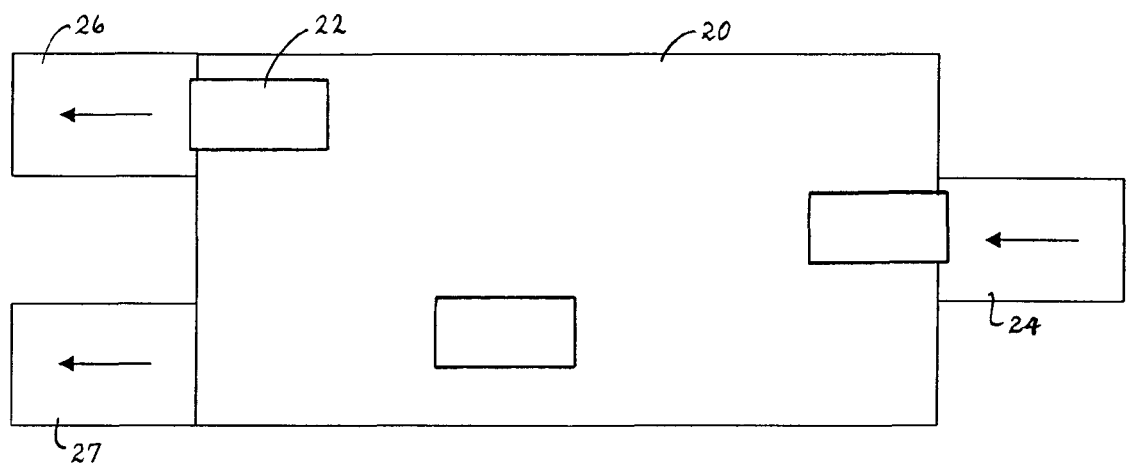
FIG. 20 is a top plan schematic of a switch conveyor fed by a single infeed conveyor and feeding two parallel outfeed conveyors.

The switch 720 shown in FIG. 18 comprises a pre-alignment conveyor 730 feeding articles to one of two side-by-side regions 54, 55 of an alignment conveyor 728. Unlike the conveyor of FIG. 1, this alignment conveyor is constructed of two side-by-side oblique-roller belts 140, 141. Each belt forms one of the two regions, and the rollers in each belt ride on permanent wearstrips 128. As the belts advance along the carryway, the rollers rotate. The rollers on the first belt 140 are mounted to rotate on axes oriented to push articles in the direction of arrow 142. The rollers on the second belt 141 are directed to push articles in the direction of arrow 143. The two oblique-roller belts may be driven in the conveying direction 46 by the same motor on the same shafts or by separate motors 44, 44' on separate shafts 40, 40', as shown. The pre-alignment conveyor 730 includes a single transverse-roller belt 144 driven by a motor 44 in the conveying direction. The transverse-roller belt has rollers mounted on axles defining axes 146 parallel to the conveying direction 46. The pre-alignment conveyor also includes a hydraulically, pneumatically, or electrically activated tilt mechanism that tilts the conveyor about a tilt axis 148 along the longitudinal centerline of the conveying surface, as indicated by two-headed arrow 150. As shown in FIG. 19, tilting the pre-alignment conveyor to the right causes a first article 22 atop the transverse-roller belt to slide downward toward the first side edge 56 of the switch atop the transverse rollers. The tilt mechanism rights the pre-alignment conveyor to transfer the article onto the first region 54 of the alignment conveyor. Similarly, the tilt mechanism tilts the transverse-roller belt to the left to divert a second conveyed article 22' to the second region 55 of the alignment conveyor. In this way, articles can be switched from a single file in an infeed conveyor to two separated outfeed conveyors. The tilt mechanism constitutes means for selectively rotating the rollers.

Although the invention has been described in detail with reference to a few preferred versions, other versions are possible. For example, many of the various alignment conveyor configurations may be used with several of the other pre-alignment conveyor configurations. As another example, the long-roller bearing surfaces may be used instead of flat wearstrips or wear pans in any embodiment. As yet another example, all the switches are shown for simplicity as having a single, centrally positioned infeed conveyor and two parallel outfeed conveyors. It is, of course, possible to extend the conveyors in width and to form multiple regions to sort the articles from more than one infeed into more than two outfeeds. And, although sensors were shown in only one of the versions, they would normally be used in all of the versions to signal a controller of the presence of a conveyed article at a strategic location, e.g., a transition from one conveyor to another or from one actuation zone to another. So, as these few examples suggest, the scope of the invention is not meant to be limited to the versions described herein.

What is claimed is:

1. A switch comprising:
    an alignment conveyor having a conveying surface extending longitudinally in a conveying direction from an upstream end to a downstream end and laterally in width from a first side edge to a second side edge and including:
        a carryway having bearing surfaces,
        at least one conveyor belt advancing along the carryway in the conveying direction and forming the conveying surface, wherein the conveyor belt includes rollers rotatable on axes oblique to the conveying direction, the rollers extending upward through the thickness of the belt into supporting contact with conveyed articles along the carryway and downward into rolling contact with the bearing surfaces in the carryway,
        wherein the conveying surface is divided into a first region extending laterally inward from the first side edge and a second region extending laterally inward from the second side edge and wherein the rollers in the first region are oriented to rotate to direct conveyed articles in the first region toward the first side edge and the rollers in the second region are oriented to rotate to direct conveyed articles in the second region toward the second side edge;
    a pre-alignment conveyor advancing articles in the conveying direction and feeding the articles selectively to one or the other of the first and second regions of the conveying surface at the upstream end of the alignment conveyor.

2. A switch as in claim 1 wherein the first region is wider than the second region.

3. A switch as in claim 1 wherein the first region and the second region have the same width.

4. A switch as in claim 1 wherein the first region and the second region are formed by laterally adjacent first and second conveyor belts.

5. A switch as in claim 1 wherein all the rollers are in constant contact with the bearing surfaces along the carryway.

6. A switch as in claim 1 further including means for selectively rotating the rollers by moving the bearing surfaces into and out of contact with the rollers in the first and second regions.

7. A switch as in claim 1 wherein only the rollers in the first region contact the bearing surfaces.

8. A switch as in claim 1 wherein the pre-alignment conveyor includes a conveyor belt having rollers rotatable on axes oblique to the conveying direction.

9. A switch as in claim 1 wherein the pre-alignment conveyor includes a first roller conveyor belt having rollers arranged to selectively rotate to direct articles conveyed in the conveying direction toward the first region of the alignment conveyor and a second roller conveyor belt having rollers arranged to selectively rotate to direct articles conveyed in the conveying direction toward the second region of the alignment conveyor, wherein the second roller conveyor belt feeds articles to the first roller conveyor belt.

10. A switch as in claim 1 wherein the pre-alignment conveyor includes a roller conveyor belt having rollers arranged to selectively rotate to direct articles conveyed in the conveying direction toward the first region of the alignment conveyor and a bearing surface under the rollers selectively actuatable into and out of contact with the rollers to cause the rollers to either rotate or idle.

11. A switch as in claim 1 wherein the pre-alignment conveyor includes a roller conveyor belt advancing in the conveying direction and having rollers arranged to rotate on axes parallel to the conveying direction and a tilting mechanism to selectively tilt the roller conveyor about a tilt axis parallel to the conveying direction.

12. A switch as in claim 1 wherein the pre-alignment conveyor includes:
    a roller conveyor belt having freely rotatable roller balls extending through the roller conveyor belt; and
    at least one belt selectively advancing laterally relative to the roller conveyor belt and contacting the roller balls to selectively direct conveyed articles toward the first or second region of the conveying surface on the alignment conveyor.

13. A switch comprising:
    a first conveyor receiving articles from an infeed conveyor, the first conveyor including:
        a roller belt advancing in a conveying direction and having rollers extending through the belt and arranged to rotate on axes oblique to the conveying direction;

a bearing surface underlying the roller belt and selectively actuatable between a first position out of contact with the rollers and a second position contacting the rollers and causing the rollers to rotate as the roller belt advances, whereby articles conveyed atop the rollers with the bearing surface in the second position are pushed to one side of the roller belt by the rotating rollers as the roller belt advances;

a second conveyor advancing in the conveying direction and receiving articles from the first conveyor, the second conveyor including:

at least one roller belt extending in width from a first side to a second side and having rollers extending through the belt and arranged to rotate on axes oblique to the conveying direction, where in the at least one roller belt includes a first region extending inward from the first side positioned to receive articles pushed to one side on the first conveyor and a second region extending inward from the second side positioned to receive the other articles, bearing surfaces underlying at least a portion of the rollers to cause the rollers to rotate by contact with the bearing surfaces as the at least one roller belt advances in the conveying direction, wherein the rollers in the second region are in constant contact with the underlying bearing surfaces and are arranged to rotate on second oblique axes oriented to direct articles conveyed atop the rollers in the second region toward the second side, and wherein the rollers in the first region are out of contact with the bearing surfaces or are in contact with the underlying bearing surfaces and arranged to rotate on first oblique axes oriented to direct articles conveyed atop the rollers in the first region toward the first side.

14. A switch for distributing articles received from an infeed conveyor to a plurality of outfeed conveyors, the switch comprising:

an alignment conveyor advancing from an upstream end to a downstream end in a conveying direction and having a conveying surface divided laterally in width between first and second sides into a plurality of lanes, each terminating in an associated outfeed position marking an outfeed conveyor at the downstream end of the alignment conveyor, wherein articles received in each lane at the upstream end are directed to the associated outfeed position of the lane as the articles are conveyed from the upstream end to the downstream end of the alignment conveyor;

a pre-alignment conveyor, disposed at the upstream end of the alignment conveyor and extending from an upstream end to a downstream end in the conveying direction, conveying articles received from an infeed conveyor at the upstream end of the pre-alignment conveyor and selectively shifting the articles laterally to distribute the articles among the lanes of the alignment conveyor;

wherein the alignment conveyor includes at least one roller belt having article-supporting rollers extending through the belt and rotatable on axes oblique to the conveying direction and bearing surfaces underlying the roller belt and contacting at least a portion of the rollers to cause the rollers to rotate and direct articles laterally as the roller belt advances in the conveying direction;

wherein the pre-alignment conveyor includes at least one roller belt having article-supporting rollers arranged to enable articles conveyed atop the rollers to be directed laterally across the pre-alignment conveyor as the roller belt advances.

15. A switch as in claim 14 wherein at least one of the lanes is wider than another of the lanes.

16. A switch as in claim 14 wherein the lanes have the same width.

17. A switch as in claim 14 wherein lanes are formed by laterally adjacent belts.

18. A switch as in claim 14 wherein all the rollers in the alignment conveyor are in constant contact with the bearing surfaces.

19. A switch as in claim 14 wherein the alignment conveyor further includes means for selectively rotating the rollers by moving the bearing surfaces into and out of contact with the rollers in the lanes.

20. A switch as in claim 14 wherein the rollers in at least one lane do not contact the bearing surfaces.

21. A switch as in claim 14 wherein the article-supporting rollers in the pre-alignment conveyor are rotatable on axes oblique to the conveying direction.

22. A switch as in claim 14 wherein the at least one roller belt in the pre-alignment conveyor comprises a first roller conveyor belt having rollers arranged to selectively rotate to direct articles conveyed in the conveying direction toward the first side of the alignment conveyor and a second roller conveyor belt having rollers arranged to selectively rotate to direct articles conveyed in the conveying direction toward the second side of the alignment conveyor, wherein the second roller conveyor belt feeds articles to the first roller conveyor belt.

23. A switch as in claim 14 wherein the at least one roller belt in the pre-alignment conveyor comprises a roller conveyor belt having rollers arranged to selectively rotate to direct articles conveyed in the conveying direction toward the first side of the alignment conveyor and a bearing surface under the rollers selectively actuatable into and out of contact with the rollers to cause the rollers to either rotate or idle.

24. A switch as in claim 14 wherein the at least one roller belt in the pre-alignment conveyor comprises a roller conveyor belt advancing in the conveying direction and having rollers arranged to rotate on axes parallel to the conveying direction and a tilting mechanism to selectively tilt the roller conveyor about a tilt axis parallel to the conveying direction.

25. A switch as in claim 14 wherein the at least one roller belt in the pre-alignment conveyor comprises a roller conveyor belt having freely rotatable roller balls extending through the roller conveyor belt.

26. A switch as in claim 25 wherein the pre-alignment conveyor further includes at least one belt selectively advancing laterally relative to the roller conveyor belt and contacting the roller balls to selectively direct conveyed articles toward the first or second side of the conveying surface on the alignment conveyor.

27. A switch as in claim 14 wherein the at least roller belt in the pre-alignment conveyor advances in the conveying direction.

28. A switch as in claim 14 wherein the at least roller belt in the pre-alignment conveyor advances perpendicular to conveying direction.

29. A switch as in claim 14 wherein the article-supporting rollers in the at least one roller belt in the pre-alignment conveyor are idle rollers.

* * * * *